United States Patent
Rao

(10) Patent No.: US 8,867,709 B2
(45) Date of Patent: Oct. 21, 2014

(54) METHOD AND SYSTEM FOR ANSWER-MODE IDENTIFICATION OF A TELEPHONY DEVICE

(75) Inventor: B. Raghavendra Rao, Bangalore (IN)

(73) Assignee: Cisco Systems, Inc., San Jose, CA (US)

( * ) Notice: Subject to any disclaimer, the term of this patent is extended or adjusted under 35 U.S.C. 154(b) by 2668 days.

(21) Appl. No.: 11/324,879

(22) Filed: Jan. 3, 2006

(65) Prior Publication Data

US 2008/0123840 A1   May 29, 2008

(51) Int. Cl.
| | | |
|---|---|---|
| *H04M 1/64* | (2006.01) | |
| *H04M 11/00* | (2006.01) | |
| *H04M 1/247* | (2006.01) | |
| *H04M 1/725* | (2006.01) | |
| *H04M 1/68* | (2006.01) | |
| *H04M 1/253* | (2006.01) | |

(52) U.S. Cl.
CPC ............ *H04M 1/247* (2013.01); *H04M 1/2473* (2013.01); *H04M 1/72594* (2013.01); *H04M 1/68* (2013.01); *H04M 1/2535* (2013.01); *H04M 1/2476* (2013.01)
USPC .......... 379/88.19; 379/76; 379/93.09

(58) Field of Classification Search
USPC ................................................. 370/331–338
See application file for complete search history.

(56) References Cited

U.S. PATENT DOCUMENTS

| | | | | |
|---|---|---|---|---|
| 5,493,609 A | * | 2/1996 | Winseck et al. ............ | 379/93.08 |
| 5,583,922 A | * | 12/1996 | Davis et al. ................ | 379/93.09 |
| 5,764,627 A | * | 6/1998 | Sharma et al. ............... | 370/271 |
| 5,802,160 A | * | 9/1998 | Kugell et al. ............. | 379/211.04 |
| 5,848,142 A | * | 12/1998 | Yaker ....................... | 379/215.01 |
| 6,373,817 B1 | * | 4/2002 | Kung et al. .................. | 370/217 |
| 6,529,737 B1 | * | 3/2003 | Price et al. .................... | 455/466 |
| 6,618,392 B1 | * | 9/2003 | Bray ............................ | 370/465 |
| 6,757,372 B1 | * | 6/2004 | Dunlap et al. ............ | 379/142.17 |
| 7,317,475 B2 | * | 1/2008 | Arai et al. ................ | 348/207.99 |
| 7,447,168 B2 | * | 11/2008 | Thaler ........................... | 370/296 |
| 7,602,748 B2 | * | 10/2009 | Sinnreich et al. ............ | 370/331 |
| 7,944,896 B1 | * | 5/2011 | Rawat et al. .................. | 370/338 |
| 2004/0082310 A1 | * | 4/2004 | Huang et al. ................. | 455/401 |
| 2004/0122941 A1 | * | 6/2004 | Creamer et al. .............. | 709/224 |
| 2005/0195954 A1 | * | 9/2005 | Klein et al. .............. | 379/201.04 |
| 2006/0205431 A1 | * | 9/2006 | Newstead .................. | 455/550.1 |
| 2007/0037605 A1 | * | 2/2007 | Logan ........................... | 455/567 |

OTHER PUBLICATIONS

David Lovell, Cisco IP Telephony, Dec. 17, 2001, 624. Cisco Press, Indianapolis IN 46240, USA.

* cited by examiner

*Primary Examiner* — Joseph T Phan
(74) *Attorney, Agent, or Firm* — Edwards Wildman Palmer LLP; James M. Behmke; Jonathon Western

(57) ABSTRACT

A method and an apparatus for the identification of the mode of a telephony device in a network are provided. A call initiation signal is received from a mode-identifying telephony device. The call initiation signal is used to communicate with a mode-selecting telephony device. Thereafter, the mode at the mode-selecting telephony device is detected and an answer mode signal, including the information regarding the answering mode of the mode-selecting telephony device, is sent to the mode-identifying telephony device.

20 Claims, 4 Drawing Sheets

METHOD AND SYSTEM FOR ANSWER-MODE IDENTIFICATION OF A TELEPHONY DEVICE

BACKGROUND OF THE INVENTION

1. Field of Invention

Embodiments of the invention relate in general to Internet telephony. More specifically, the embodiments of the invention relate to a method and a system for mode identification of telephony devices in Internet telephony.

2. Description of the Background Art

Voice-based communication is commonly used to share information in a network. The network may be a Local Area Network (LAN), a Wide Area Network (WAN), a circuit-switched network such as a Public Switched Telephone Network (PSTN), and so forth. Devices such as a circuit-switched telephone, a wireless cellular phone, a soft phone, an IP phone, and so forth can be used for voice-based communication. Each of these devices is capable of operating in various modes, such as the speaker mode, the handset mode, and other modes available on the devices Users can share confidential and privileged information in a voice-based communication network. Further, they may want to share this information with only a particular listener among a group of listeners. In such a case, the listener can use the headset mode. However, the user may not know the mode used by the listener. Consequently, confidentiality can be breached if the listener is not on the headset or handset mode.

Conventionally, such a confidentiality breach is avoided manually. In a circuit-switched network phone, a wireless cellular phone and an IP phone, the user can request the listener to use a particular mode. The request can be made by sending a message in the case of a soft-phone, a wireless cellular phone, and an IP phone with messaging facility. The request to switch to the particular mode can also be made over the telephone device.

Communication protocols such as Skinny Client Control Protocol (SCCP), Session Initiation Protocol (SIP), Code Division Multiple Access (CDMA), and Global System for Mobile telecommunications (GSM), etc., may be used to communicate over the network. However, these protocols do not provide techniques for automatic identification of the mode.

DETAILED DESCRIPTION OF EMBODIMENTS OF THE INVENTION

Various embodiments of the invention provide methods, systems, and computer-readable media for the identification of a mode of a telephony device in a network. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In accordance with an embodiment of the present invention, mode identification at a mode-identifying telephony device takes place by means of a network device. The network device receives a call initiation signal from the mode-identifying telephony device. Thereafter, the mode-identifying telephony device gets connected to a mode-selecting telephony device. This facilitates the network device to detect the mode of the mode-selecting telephony device. Further, information pertaining to the mode of the mode-selecting telephony device is sent to the mode-identifying telephony device.

Figure 1:
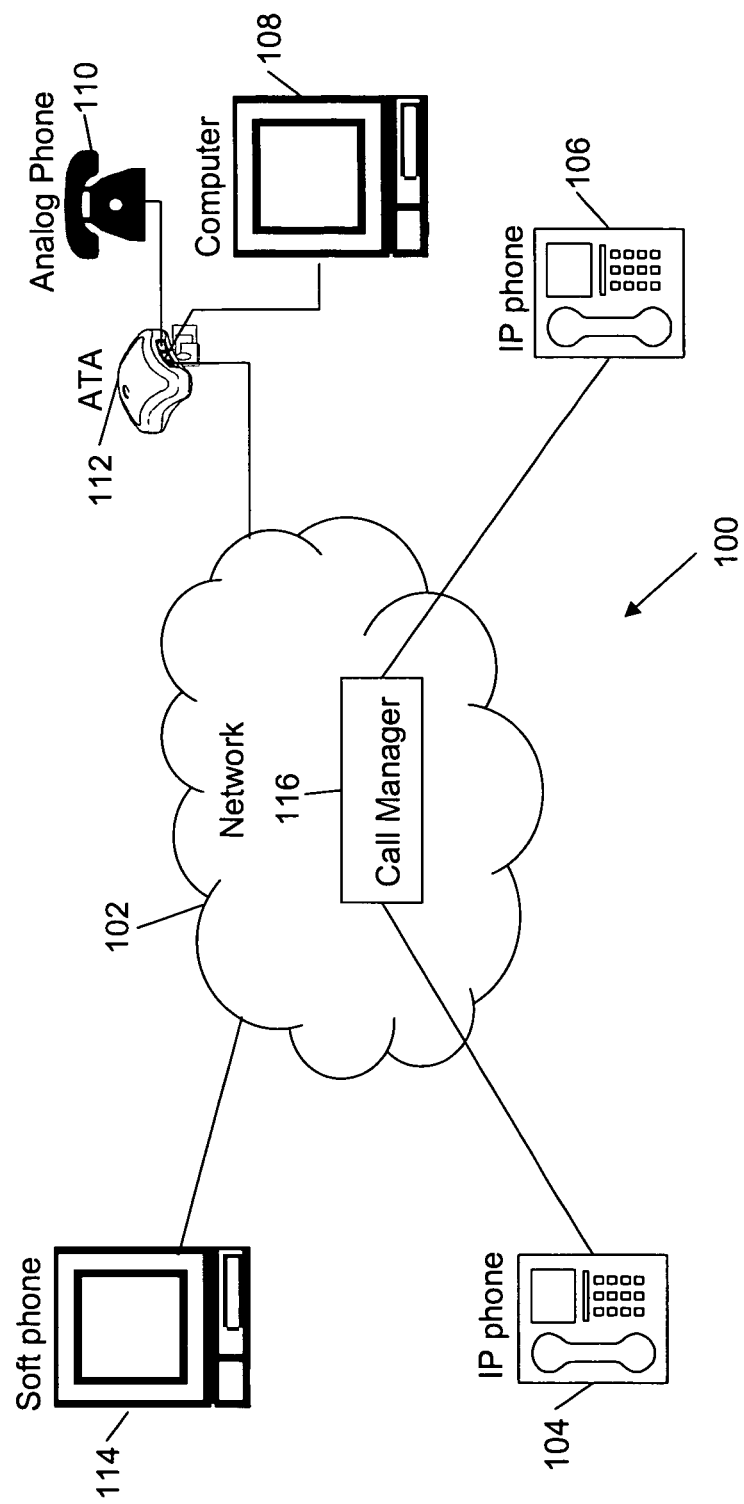
FIG. 1 illustrates an exemplary environment, wherein embodiments of the invention can be practiced.

Referring now to the drawings, particularly by their reference numbers, FIG. 1 illustrates an exemplary environment 100, wherein the embodiments of the invention can be practiced. Environment 100 includes a network 102. Network 102 may be a packet-switched network such as a Local Area Network (LAN), a Wide Area Network (WAN), and so forth. Communication can take place over network 102 by using Internet telephony protocols Skinny Client Communication Protocol (SCCP), H.323, Session Initiation Protocol (SIP), Skype, and so forth. Network 102 may also be a circuit-switched network such as a Public Switched Network Protocol (PSTN). Environment 100 further includes various devices, such as a mode-identifying telephony device 104, a mode-selecting telephony device 106, a computer 108, an analog phone 110, an Analog Telephony Adapter (ATA) 112, a soft phone 114 and a call manager 116. Mode-identifying telephony device 104 and mode-selecting telephony device 106 share information across the network 102. Network 102 includes a plurality of telephony devices, connected by switching, routing elements, and call manager 116.

Mode-identifying telephony device 104 is connected to mode-selecting telephony device 106 by two links—a first link and a second link. The first link carries real-time audio streams through the routing and switching devices in network 102. The second link connects mode-identifying telephony device 104 to call manager 116 in network 102. Further, call manager 116 is connected to mode-selecting telephony device 106. In an embodiment of the invention, mode-identifying telephony device 104 and mode-selecting telephony device 106 use the SCCP protocol for communication. In the SCCP protocol, the first link uses RTP/UDP/IP and the second link uses TCP/IP, to communicate. In another embodiment of the invention, mode-selecting telephony device 106 uses an H.323 protocol to communicate with the call manager 116. The call manager 116 can be, for example, a CallManager™ from Cisco.

Mode-identifying telephony device 104 and mode-selecting telephony device 106 can be Desktop IP phones that are capable of operating in various modes, hereinafter referred as answering modes. These answering modes include, by way of example only, a speaker mode, a handset mode, or other modes of answering. Mode-identifying telephony device 104 and mode-selecting telephony device 106 include display devices to display information such as the dialed number, the duration of the call, the time of the call, and so forth. The display device of mode-identifying telephony device 104 may also display the answering mode of mode-selecting telephony device 106. In an embodiment of the invention, mode-identifying telephony device 104 is analog phone 110 connected to network 102 through ATA 112. ATA 112 enables the analog phone to be connected to the Internet. ATA 112 also enables connecting the analog phone to a computer. Loading software on the computer enables notification of the answering mode of mode-selecting telephony device 106. In another embodiment of the invention, mode-identifying telephony device 104 can be soft phone 114. Soft phone 114 is software that may be installed on a computer that is connected to the Internet, and enables Internet Telephony. Examples of soft phones include Skype, Gnome Meeting, Tivi, and so forth. Mode-identifying telephony device 104 can have functionalities that are similar to those of mode-selecting telephony device 106.

Figure 2:
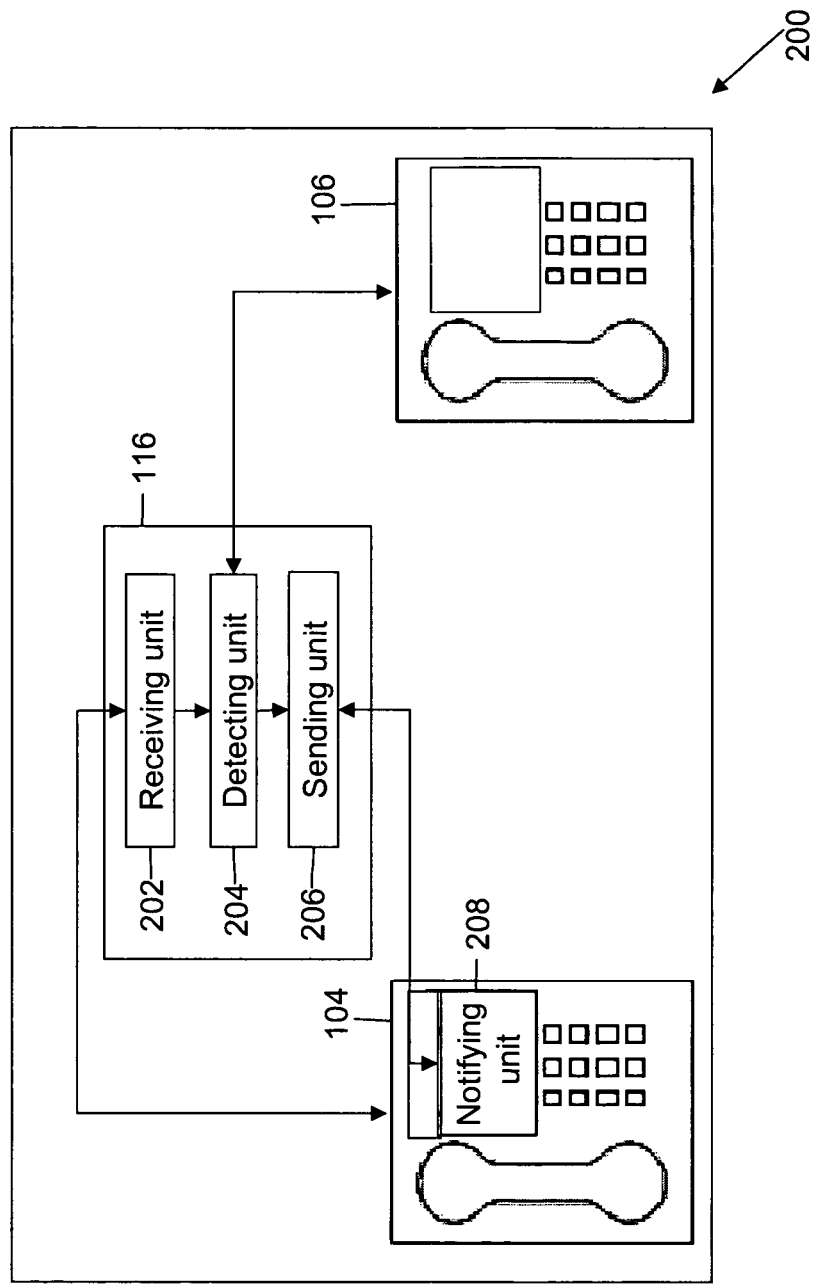
FIG. 2 illustrates a system for the identification of the answering mode of a telephony device, in accordance with an exemplary embodiment of the present invention.

FIG. 2 illustrates a system 200, for the identification of the answering mode of the mode-selecting telephony device, in accordance with an exemplary embodiment of the present invention. System 200 includes mode-identifying telephony device 104, mode-selecting telephony device 106, and call manager 116. Call manager 116 comprises a receiving unit 202, a detecting unit 204 and a sending unit 206. Mode-identifying telephony device 104 comprises a notifying unit 208. Receiving unit 202 receives a call initiation signal from mode-identifying telephony device 104. The call initiation signal is then sent to detecting unit 204. Thereafter, detecting unit 204 detects an answering mode of mode-selecting telephony device 106. The answering mode of mode-selecting telephony device 106 is detected by the configuration of the sound card. The information regarding the answering mode of mode-selecting telephony device 106 is then included in an answer mode signal. Subsequently, the answer mode signal is sent to sending unit 206. Thereafter, sending unit 206 sends the answer mode signal to notifying unit 208 at mode-identifying telephony device 104. Notifying unit 208 receives the answer mode signal and indicates the answering mode of mode-selecting telephony device 106 at mode-identifying telephony device 104.

Notifying unit 208 can include an analyzing unit, a display unit, and a sound-signal. The analyzing unit analyzes the answer mode signal, to identify the answering mode of mode-selecting telephony device 106. The analysis includes identifying the location, support for answering mode detection, activation or deactivation of the detection of the answering mode, the type of answering mode selected of mode-selecting telephony device 106. The display unit displays the answering mode of mode-selecting telephony device 106. In an embodiment of the present invention, the sound-signal unit indicates the answering mode of mode-selecting telephony device 106 by generating a sound/beep corresponding to the answering mode.

In an embodiment of the present invention, the elements of system 200 can be implemented in the form of software, hardware, firmware, or their combination thereof.

Figure 3:
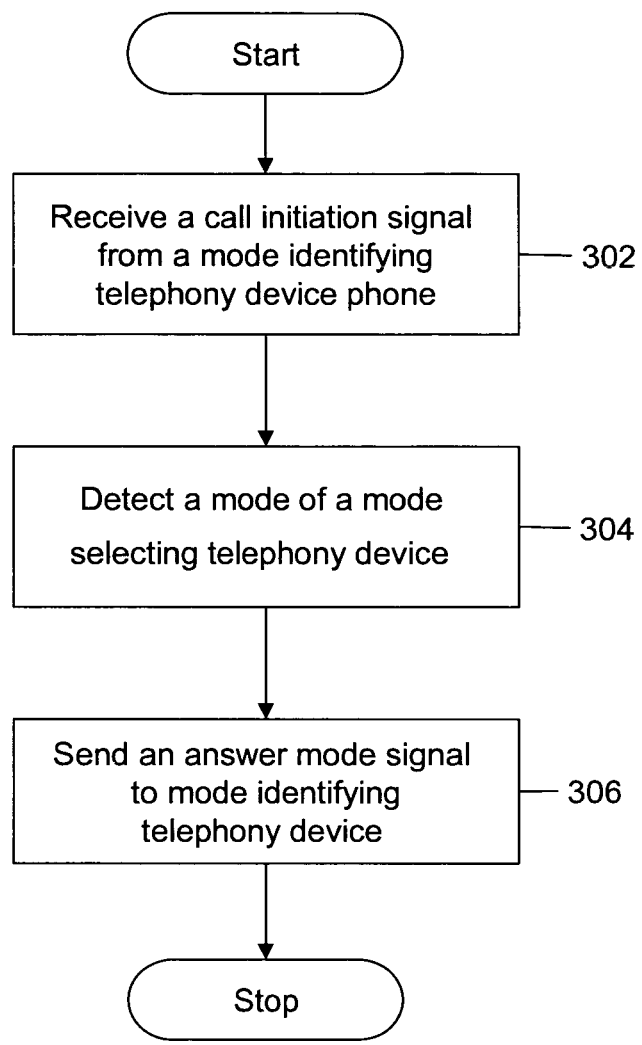
FIG. 3 is a flowchart of a method for the identification of the answering mode of a telephony device in a network, in accordance with an exemplary embodiment of the invention.

FIG. 3 is a flowchart of a method for identifying the answering mode of a telephony device in a network, in accordance with an exemplary embodiment of the invention. At step 302, receiving unit 202 receives a call initiation signal mode-identifying telephony device 104, to enable communication with mode-selecting telephony device 106. This communication over network 102 is enabled by call manager 116. Call manager 116 instructs multiple routers and switches in network 102 to open connection ports for the information from mode-identifying telephony device 104 to be sent to mode-selecting telephony device 106. Thereafter, at step 304, detecting unit 204 detects the answering mode of mode-selecting telephony device 106. This is done by collecting information pertaining to the answering mode of mode-selecting telephony device 106. The various answering modes of mode-selecting telephony device 106 may be a speaker mode, a headset mode, a handset mode, and so forth. Thereafter, at step 306, sending unit 206 sends the answer mode signal to notifying unit 208.

Figure 4:
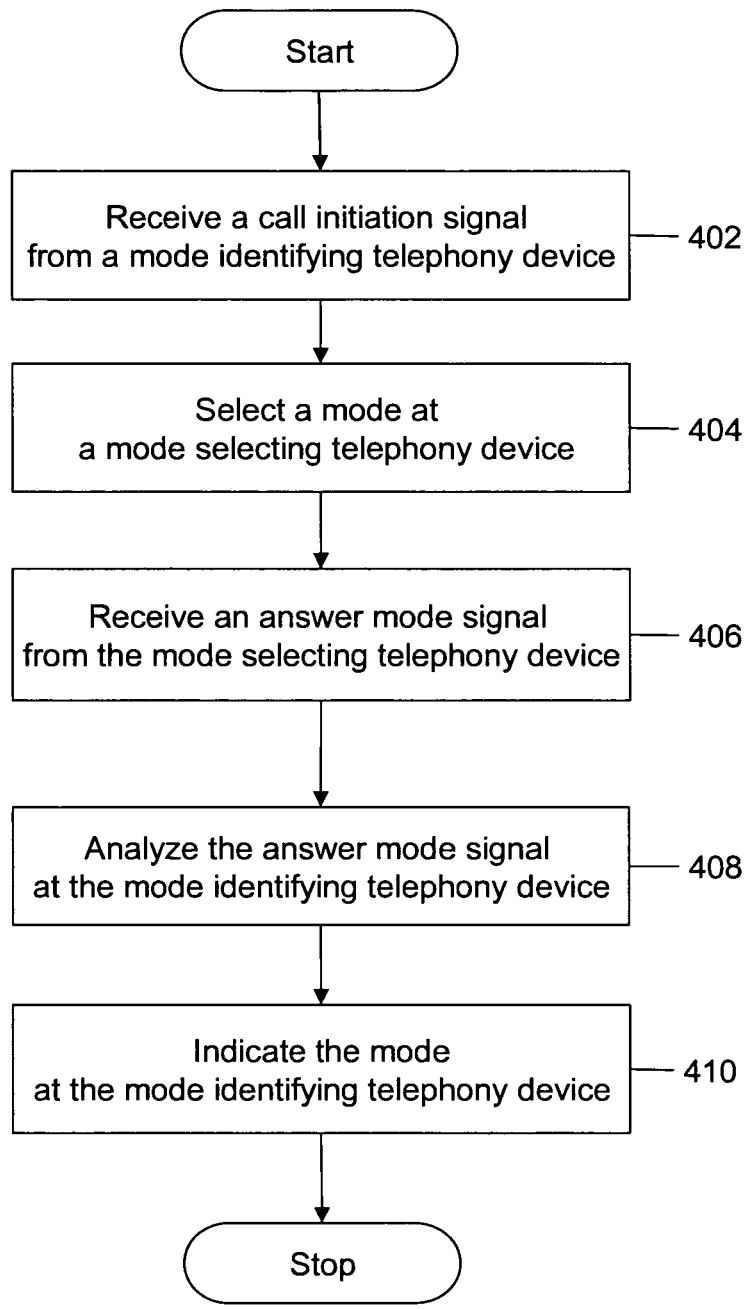
FIG. 4 is a flowchart of a method for the identification of the answering mode of a telephony device in a network, in accordance with another exemplary embodiment of the invention.

FIG. 4 is a flowchart of a method for the identification of the answering mode of a telephony device in a network, in accordance with another exemplary embodiment of the invention. At step 402, receiving unit 202 receives a call initiation signal mode-identifying telephony device 104, to enable communication with mode-selecting telephony device 106. Thereafter, at step 404, an answering mode is selected at mode-selecting telephony device 106. The answering mode may be selected by picking up the handset at mode-selecting telephony device 106. In an embodiment of the invention, a headset is plugged in at mode-selecting telephony device 106. In another embodiment of the invention, a predefined key is pressed at mode-selecting telephony device 106 for answering mode selection. In various embodiments of the invention, the predefined keys include an 'answer' key, an 'enable' key, or a sequence of number key at mode-selecting telephony device 106.

Further, detecting unit 204 detects the answering mode of mode-selecting telephony device 106 by collecting information pertaining to the answering mode of mode-selecting telephony device 106. Detecting unit 204 sends a signal to mode-selecting telephony device 106 to seek information pertaining to the answering mode. The signal may be generated at detecting unit 204 or mode-identifying telephony device 104. In an embodiment of the invention, a key pressed at mode-identifying telephony device 104 triggers the detection. For example, the key includes a 'detect' key, a sequence of numbered keys at mode-identifying telephony device 104, and so forth. Further, mode-selecting telephony device 106 provides information pertaining to the answering mode by sending back an answer mode signal. In an embodiment of the invention, information pertaining to the answering mode is continuously signaled over network 102 by mode-selecting telephony device 106.

Thereafter, at step 406, the answer mode signal is received from mode-selecting telephony device 106. The answer mode signal may be generated at mode-selecting telephony device 106. Further, the answer mode signal includes various data bits for defining the answering mode. These data bits indicate support for answering mode detection, activation or deactivation of the detection of the answering mode, the type of answering mode selected, etc. For example, a data bit '1' may indicate that answering-mode detection at mode-selecting telephony device 106 has been deactivated. Another data bit may indicate that mode-selecting telephony device 106 cannot support answering-mode detection. Further, the generation of the answer mode signal involves the assignment of values to various data bits. Thereafter, information pertaining to the answering mode of mode-selecting telephony device 106 is incorporated along with the data bits, into the answer mode signal. The answer mode signal is then received at detecting unit 204. Thereafter, detecting unit 204 sends the answer mode signal to sending unit 206. In an embodiment of the invention, the answer mode signal is processed at sending unit 206, to satisfy the protocol requirements of mode-identifying telephony device 104. Sending unit 206 may have multiplexers, protocol converters and storage modules to store protocols. Further, sending unit 206 sends the answer mode signal to notifying unit 208.

Thereafter, at step 408, the answer mode signal is analyzed at mode-identifying telephony device 104. Analyzing the answer mode signal includes receiving the answer mode signal from notifying unit 208, analyzing the answer mode signal to collect information about the answering mode of mode-selecting telephony device 106. Thereafter, at step 410, the answering mode is indicated to the user at mode-identifying telephony device 104. In an embodiment of the present invention, support for answering-mode detection, activation or deactivation of the detection of the answering mode, and the type of answering mode selected at mode-selecting telephony device 106 are indicated at mode-identifying telephony device 104. The indication include displaying icons, text/numbers, flashing icons, darkened icons on a display screen, flashing Light Emitting Diodes (LED), on/off LED, and so forth. In another embodiment of the invention, the answering mode of mode-selecting telephony device 106 is indicated at mode-identifying telephony device 104 by sound signals. These sound signals include recorded voice, tone, and so forth.

According to an embodiment of the present invention, a method for identification of a mode of a telephony device in a network is provided. The method comprises receiving a call initiation signal, wherein the call initiation signal is received from a mode-identifying telephony device for communicating with a mode-selecting telephony device; detecting a mode of the mode-selecting telephony device, wherein the mode is selected by the mode-selecting telephony device; and sending an answer mode signal, wherein the answer mode signal is sent to the mode-identifying telephony device, the answer mode signal comprising the mode of the mode-selecting telephony device.

In another embodiment of the invention, a method for identifying a mode of a telephony device in a network is provided. The method comprises receiving a call initiation signal, wherein the call initiation signal is received from a mode-identifying telephony device for communicating with a mode-selecting telephony device; detecting a mode of the mode-selecting telephony device, wherein the mode comprises information pertaining answering mode of the mode-selecting telephony device; sending an answer mode signal, wherein the answer mode signal is sent to the mode-identifying telephony device, the answer mode signal comprising the mode of the mode-selecting telephony device; indicating the mode of the mode-selecting telephony device, the mode of the mode-selecting telephony device is displayed as an icon on a display screen the mode-identifying telephony device.

In yet another embodiment of the invention, a system for identifying a mode of a telephony device in a network is provided. The system comprises a mode-selecting telephony; a mode-selecting telephony device; and a call manager, the call manager comprising means for receiving a call initiation signal, wherein the call initiation signal is received from a mode-identifying telephony device for communicating with a mode-selecting telephony device; means for detecting a mode of the mode-selecting telephony device, wherein the mode comprises information pertaining answering mode of the mode-selecting telephony device; and means for sending an answer mode signal, wherein the answer mode signal is sent to the mode-identifying telephony device, the answer mode signal comprising the mode of the mode-selecting telephony device.

Various embodiments of the invention provide a machine-readable medium that includes instructions executable by a computer processor. One or more of these instructions receive a call initiation signal from a mode-identifying telephony device for communicating with a mode-selecting telephony device. Other instructions detect a mode of the mode-selecting telephony device, the mode comprises information pertaining answering mode of the mode-selecting telephony device. Still other instructions send an answer mode signal to the mode-identifying telephony device, the answer mode signal comprising the mode of the mode-selecting telephony device.

In other embodiments, an apparatus for identifying a mode of a telephony device in a network is provided. The apparatus comprises a processor for executing instructions and a machine-readable medium that includes instructions executable by the processor. The instruction enables the apparatus to receive a call initiation signal, wherein the call initiation signal is received from a mode-identifying telephony device for communicating with a mode-selecting telephony device; to detect a mode of the mode-selecting telephony device, wherein the mode comprises information pertaining the mode of the mode-selecting telephony device; and to send a answer mode signal, wherein the answer mode signal is sent to the mode-identifying telephony device, the answer mode signal comprising the mode of the mode-selecting telephony device.

Embodiments of the present invention automate the identifying of mode of answering of a telephony device by a user at the other end. This feature makes the sharing of confidential and privileged information over the voice medium more reliable and secure. The feature is also supported by a range of protocols. In an embodiment of the invention, the answering mode is indicated by the voice medium. This feature may be useful for users with impaired vision. Moreover, it is also useful for users who are carrying out several tasks simultaneously at their workstations.

Although the invention has been discussed with respect to specific embodiments thereof, these embodiments are merely illustrative, and not restrictive, of the invention. For example, a 'method for identification of a mode of a telephony device' can include any type of analysis, manual or automatic, to anticipate the needs of identification.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, or communicate the computer program for use by or in connection with the instruction execution system apparatus, system or device. The computer readable medium can be, by way of example only but not by limitation, an electronic, magnetic, electromagnetic, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for identifying a mode of a telephony device in a network, the method comprising:
   receiving, from a mode-identifying telephony device, a call initiation signal associated with a call between the mode-identifying telephony device and a mode-selecting telephony device;
   in response to receiving the call initiation signal, sending a request signal to the mode-selecting telephony device for information about an answering mode associated with the call that is selected by the mode-selecting telephony device;
   receiving, from the mode-selecting telephony device, an answer mode signal that includes one or more of a first bit indicating activation or deactivation of answering mode detection at the mode-selecting telephony device, a second bit indicating whether answering mode detection is supported by the mode-selecting telephony device, or additional data bits indicating type of the answering mode selected by the mode-selecting telephony device;

processing the answer mode signal for compatibility with a protocol used by the mode-identifying telephony device; and sending the processed answer mode signal to the mode-identifying telephony device, wherein the answering mode selected by the mode-selecting telephony device is indicated at the mode-identifying telephony device based on information included in the processed answer mode signal.

2. The method of claim 1, wherein the answering mode is one of a speaker mode, a handset mode, or another mode of answering the call by the mode-selecting telephony device.

3. The method of claim 1, wherein selection of the answering mode signal by the mode-selecting telephony device comprises one of:
  picking up a handset at the mode-selecting telephony device,
  plugging in a headset at the mode-selecting telephony device, or
  pressing a predefined key at the mode-selecting telephony device.

4. The method of claim 1, wherein sending the request signal to the mode-selecting telephony device in response to receiving the call initiation signal comprises:
  pressing one of a predefined key, or a sequence of numbered keys, at the mode-identifying telephony device; and
  generating the call initiation signal by the mode-identifying telephony device based on the pressing.

5. The method of claim 1, wherein the indicating the answering mode comprises:
  displaying an icon on a display screen coupled to the mode-identifying telephony device.

6. A method for identifying a mode of a telephony device in a network, the method comprising:
  receiving, from a mode-identifying telephony device, a call initiation signal associated with a call between the mode-identifying telephony device and a mode-selecting telephony device;
  receiving, from the mode-selecting telephony device, an answer mode signal that includes one of a first bit indicating activation or deactivation of answering mode detection at the mode-selecting telephony device, a second bit indicating whether answering mode detection is supported by the mode-selecting telephony device, or additional data bits indicating type of an answering mode associated with the call that is selected by the mode-selecting telephony device, wherein the answering mode is one of a speaker mode, a handset mode, or another mode of answering the call by the mode-selecting telephony device; and
  sending the answer mode signal to the mode-identifying telephony device,
  wherein the answering mode of the mode-selecting telephony device is displayed on the mode-identifying telephony device based on processing the answer mode signal.

7. A system for identifying a mode of a telephony device in a network, the system comprising:
  a first module including first instructions stored in a first machine-readable medium for execution by a first processor, the first instructions when executed operable to cause the first processor to perform operations comprising:
    receiving, from a mode-identifying telephony device, a call initiation signal associated with a call between the mode-identifying telephony device and a mode-selecting telephony device;
    in response to receiving the call initiation signal, sending a request signal to the mode-selecting telephony device for information about an answering mode associated with the call that is selected by the mode-selecting telephony device; and
    receiving, from the mode-selecting telephony device, an answer mode signal;
  means for detecting an answering mode of the mode-selecting telephony device, wherein the answering mode is detected based on the answer mode signal, which includes one of a first data bit indicating activation or deactivation of answering mode detection at the mode-selecting telephony device, a second data bit indicating whether answering mode detection is supported by the mode-selecting telephony device, or additional data bits indicating a type of the answering mode selected by the mode-selecting telephony device; and
  a second module including second instructions stored in a second machine-readable medium for execution by a second processor, the second instructions when executed operable to cause the second processor to perform operations comprising:
    sending the answer mode signal to the mode-identifying telephony device, wherein the answering mode selected by the mode-selecting telephony device is indicated at the mode-identifying telephony device based on information included in the answer mode signal.

8. The system of claim 7, comprising means for processing the answer mode signal for compatibility with a protocol used by the mode-identifying telephony device.

9. An apparatus for identifying mode of a telephony device in a network, the apparatus comprising:
  a non-transitory computer-readable storage medium including instructions executable by a processor, the instructions configured to cause the processor to perform operations comprising:
    receiving, from a mode-identifying telephony device, a call initiation signal associated with a call between the mode-identifying telephony device and a mode-selecting telephony device;
    receiving, from the mode-selecting telephony device, an answer mode signal that includes one of a first data bit indicating activation or deactivation of answering mode detection at the mode-selecting telephony device, a second data bit indicating whether answering mode detection is supported by the mode-selecting telephony device, or additional data bits indicating a type of the answering mode selected by the mode-selecting telephony device;
    processing the answer mode signal for compatibility with a protocol used by the mode-identifying telephony device; and
    sending the processed answer mode signal to the mode-identifying telephony device, wherein the answering mode selected by the mode-selecting telephony device is indicated at the mode-identifying telephony device based on information included in the processed answer mode signal.

10. A non-transitory computer-readable storage medium including instructions executable by a processor that, when executed, configured to cause the processor to perform operations comprising:

receiving, from a mode-identifying telephony device, a call initiation signal associated with a call between the mode-identifying telephony device and a mode-selecting telephony device;

receiving, from the mode-selecting telephony device, an answer mode signal that includes one of a first data bit indicating activation or deactivation of answering mode detection at the mode-selecting telephony device, a second data bit indicating whether answering mode detection is supported by the mode-selecting telephony device, or additional data bits indicating a type of the answering mode selected by the mode-selecting telephony device;

processing the answer mode signal for compatibility with a protocol used by the mode-identifying telephony device; and sending the processed answer mode signal to the mode-identifying telephony device, wherein the answering mode selected by the mode-selecting telephony device is indicated at the mode-identifying telephony device based on information included in the processed answer mode signal.

11. The method of claim 6, wherein the answering mode is one of a speaker mode, a handset mode, or another mode of answering the call by the mode-selecting telephony device.

12. The method of claim 6, wherein receiving the call initiation signal comprises:

pressing one of a predefined key, or a sequence of numbered keys, at the mode-identifying telephony device; and generating the call initiation signal by the mode-identifying telephony device based on the pressing.

13. The system of claim 7, wherein the answering mode is one of a speaker mode, a handset mode, or another mode of answering the call by the mode-selecting telephony device.

14. The system of claim 7, wherein sending the request signal to the mode-selecting telephony device in response to receiving the call initiation signal comprises:

pressing one of a predefined key, or a sequence of numbered keys, at the mode-identifying telephony device; and generating the call initiation signal by the mode-identifying telephony device based on the pressing.

15. The apparatus of claim 9, wherein the answering mode is one of a speaker mode, a handset mode, or another mode of answering the call by the mode-selecting telephony device.

16. The apparatus of claim 9, wherein receiving the call initiation signal comprises:

pressing one of a predefined key, or a sequence of numbered keys, at the mode-identifying telephony device; and generating the call initiation signal by the mode-identifying telephony device based on the pressing.

17. The computer-readable medium of claim 10, wherein the answering mode is one of a speaker mode, a handset mode, or another mode of answering the call by the mode-selecting telephony device.

18. The computer-readable medium of claim 10, wherein receiving the call initiation signal comprises:

pressing one of a predefined key, or a sequence of numbered keys, at the mode-identifying telephony device; and generating the call initiation signal by the mode-identifying telephony device based on the pressing.

19. The method of claim 5, wherein displaying the icon comprises displaying one of alphanumeric text, flashing icons, or darkened icons on the display screen.

20. The method of claim 1, wherein the indicating the answering mode comprises playing a sound signal at the mode-identifying telephony device, the sound signal being one of a recorded voice, or a tone.

* * * * *